US008285172B2

(12) United States Patent
Enomoto (10) Patent No.: US 8,285,172 B2
(45) Date of Patent: Oct. 9, 2012

(54) IMAGE FORMING APPARATUS HAVING ORIGINAL READING UNIT MOVABLE RELATIVE TO IMAGE FORMING UNIT

(75) Inventor: Hideki Enomoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 531 days.

(21) Appl. No.: 12/559,712

(22) Filed: Sep. 15, 2009

(65) Prior Publication Data

US 2010/0085608 A1    Apr. 8, 2010

(30) Foreign Application Priority Data

Oct. 3, 2008  (JP) ................. 2008-258930

(51) Int. Cl.
*G03G 15/00* (2006.01)
(52) U.S. Cl. ........ 399/110; 399/124; 399/367; 399/377; 347/138; 347/152
(58) Field of Classification Search ............... 399/107, 399/110, 124, 377, 367; 347/138, 152
See application file for complete search history.

(56) References Cited

U.S. PATENT DOCUMENTS

| 7,605,954 | B2* | 10/2009 | Manabe et al. ............... 399/367 |
| 7,890,019 | B2* | 2/2011 | Tateishi et al. |
| 8,089,666 | B2* | 1/2012 | Andoh et al. |
| 2007/0147869 | A1* | 6/2007 | Akiyama et al. ............... 399/107 |

FOREIGN PATENT DOCUMENTS

| JP | 06316347 A | * 11/1994 |
| JP | 2005-53648 | 3/2005 |
| JP | 2006148370 A | * 6/2006 |

* cited by examiner

*Primary Examiner* — David Gray
*Assistant Examiner* — Laura Roth
(74) *Attorney, Agent, or Firm* — Kubotera & Associates, LLC (57) ABSTRACT

An image forming apparatus includes an image forming unit an original reading unit and a guide mechanism. The image forming unit includes a sheet supply unit; a transportation roller for transporting a medium from the sheet supply unit; an image drum unit for forming a toner image on a photosensitive drum; a transfer belt unit for transferring the toner image on the photosensitive drum to the medium; a fixing device for fixing the toner image to the medium; and a stacker for placing the medium. The original reading unit includes an original stage for placing an original; a scanner unit disposed below the original stage; and a transportation unit for transporting the original to the original stage and a sheet discharge unit. The guide mechanism includes a pair of guide walls integrally formed at upper edges of the image forming unit.

13 Claims, 12 Drawing Sheets

IMAGE FORMING APPARATUS HAVING ORIGINAL READING UNIT MOVABLE RELATIVE TO IMAGE FORMING UNIT

BACKGROUND OF THE INVENTION AND RELATED ART STATEMENT

The present invention relates to an image forming apparatus.

A conventional image forming apparatus has an original reading unit at an upper portion thereof and an image forming unit at a lower portion thereof. The image forming unit includes an upper cover disposed at an upper portion thereof to be freely opened and closed, so that a consumable supply is replaced or a paper jam is removed. When a consumable supply is replaced, for example, the original reading unit rotates upwardly and is set in an inclined state, so that the upper cover is opened. The original reading unit is arranged to be lifted over the image forming unit at a backside of the conventional image forming apparatus, so that the original reading unit does not interfere with the upper cover to be opened and closed (refer to Patent Reference).

Patent Reference: Japan Patent Publication No. 2005-53648

When the original reading unit is situated over the image forming unit at the backside of the conventional image forming apparatus, the original reading unit is away from a front portion of the image forming unit by a relatively large distance. Accordingly, when the conventional image forming apparatus is placed on a second tray or an office desk, it is difficult to place or pick up an original on or from the original reading unit. Further, it is difficult to operate an operation panel disposed on the original reading unit.

In view of the problems described above, an object of the present invention is to provide an image forming apparatus capable of solving the problems of the conventional image forming apparatus.

Further objects and advantages of the invention will be apparent from the following description of the invention.

SUMMARY OF THE INVENTION

In order to attain the objects described above, according to a first aspect of the present invention, an image forming apparatus includes an image forming unit having an upper cover to be freely opened and closed; an original reading unit disposed above the original forming unit; and a guide mechanism for moving and positioning the original reading unit over the image forming unit between a backside of the image forming apparatus and a front side of the image forming apparatus.

According to a second aspect of the present invention, the guide mechanism includes a pair of guide walls disposed on upper both sides of the image forming unit; guide grooves formed in the guide walls; and a plurality of protrusions protruding from both sides of the image reading unit for engaging the guide walls.

According to a third aspect of the present invention, the guide mechanism further includes a backside protrusion disposed on one side edge of the original reading unit for engaging one end portion of the guide groove; and an introduction groove for disengaging the protrusions from the guide grooves when the original reading unit rotates around the protrusion.

In the present invention, it is possible to dispose the original reading unit at a substantially center position over the original forming unit to be movable. Accordingly, the original reading unit is away from a front portion of the image forming unit by a short distance. As a result, it is possible to easily place or pick up an original, and to easily operate an operation panel disposed on the original reading unit.

Further, it is possible to move the original reading unit over the image forming unit to the backside of the image forming apparatus. Accordingly, the upper cover disposed on the image forming unit can be freely opened and closed to easily remove a paper jam.

DETAILED DESCRIPTION OF THE PREFERRED EMBODIMENTS

Hereunder, embodiments of the present invention will be described in detail with reference to the accompanying drawings. In the following description, the present invention is applied to an image forming apparatus.

First Embodiment

Figure 2:
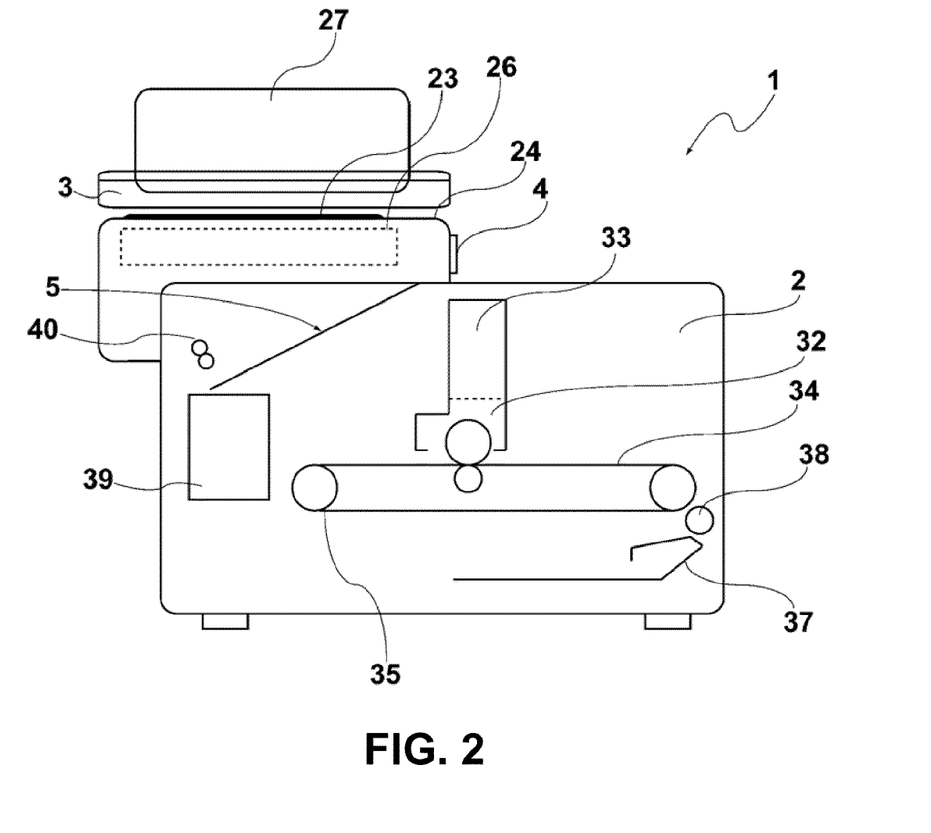
FIG. 2 is a schematic view showing the image forming apparatus according to the first embodiment of the present invention.

A first embodiment of the present invention will be explained. FIG. 2 is a schematic view showing an image forming apparatus 1 according to the first embodiment of the present invention.

As shown in FIG. 2, the image forming apparatus 1 includes an image forming unit 2 and an original reading unit 3. The image forming unit 2 includes a sheet supply unit 37; a transportation roller 38 for transporting a medium picked up from the sheet supply unit 37; an image drum unit 32 for forming a toner image on a photosensitive drum; a transfer belt unit 35 for transferring the toner image on the photosensitive drum to the medium; a fixing device 39 for fixing the toner image to the medium; and a stacker 5 for placing the medium discharged after a fixing process.

Figure 3:
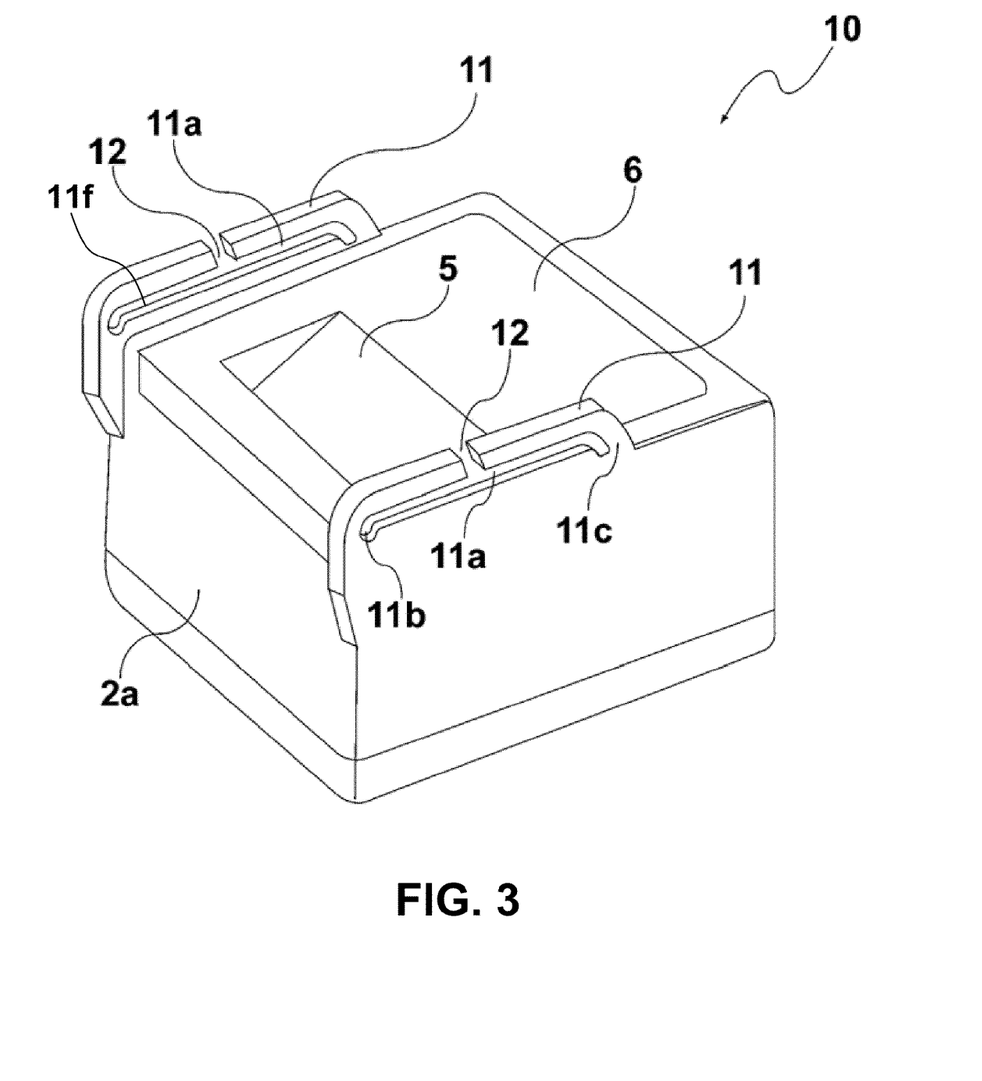
FIG. 3 is a schematic perspective view showing the guide mechanism of the image forming apparatus according to the first embodiment of the present invention.

FIG. 3 is a schematic perspective view showing a guide mechanism 10 of the image forming apparatus 1 according to the first embodiment of the present invention. As shown in FIG. 3, the image forming unit 2 includes an upper cover 6 at an upper portion thereof to be freely opened and closed.

In the embodiment, the original reading unit 3 includes an original stage 24 for placing an original 23; a scanner unit 26 disposed below the original stage 24; and a transportation unit 27 for transporting the original 23 to the original stage 24 one by one, and for transporting the original 23 to a sheet discharge unit after the scanner unit 26 reads the original 23. The original reading unit 3 further includes an operation panel 4 at a front portion thereof.

Figure 1:
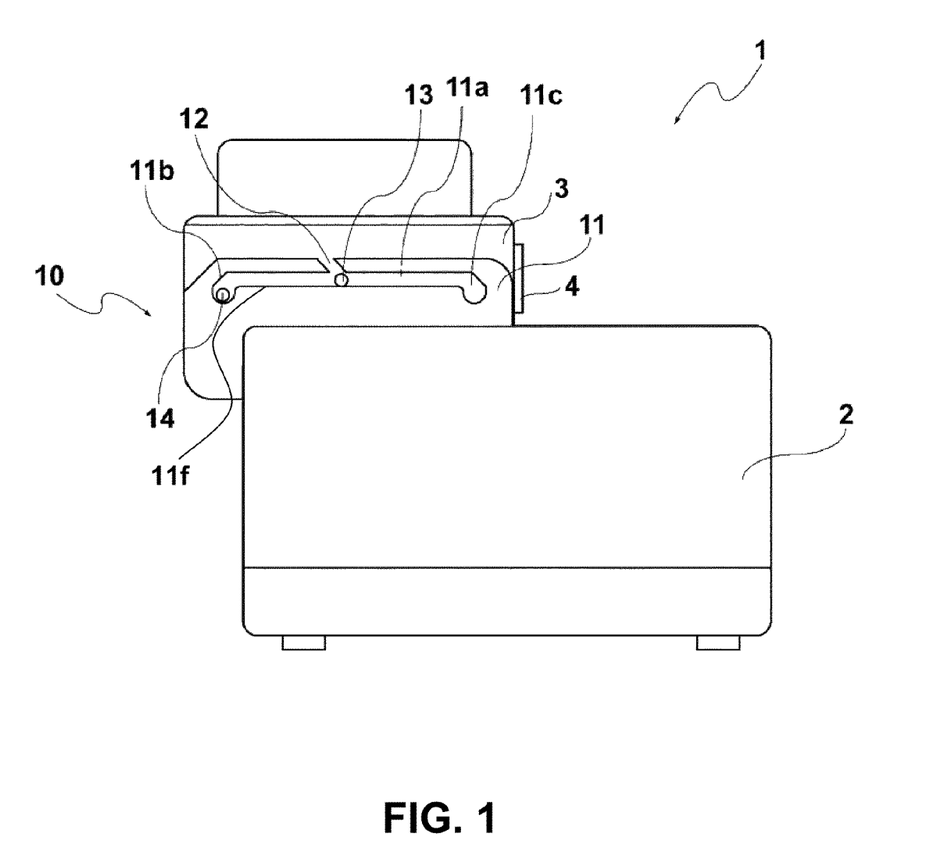
FIG. 1 is a schematic side view showing an image forming apparatus having a guide mechanism according to a first embodiment of the present invention.

FIG. 1 is a schematic side view showing the image forming apparatus 1 having the guide mechanism 10 according to the first embodiment of the present invention.

As shown in FIGS. 1 and 3, the guide mechanism 10 includes a pair of guide walls 11 integrally formed at upper edges of the image forming unit 2 on both sides thereof. Each of the guide walls 11 is situated at a backside surface 2a of the image forming apparatus 1, and has a guide groove 11a. The guide groove 11a extends in horizontal direction. The guide groove 11a has positioning grooves 11b and 11c at both end portions thereof, and the positioning grooves 11b and 11c extend obliquely and downwardly. The guide groove 11a further has a guide groove main portion 11f at a center portion thereof. The guide wall 11 further has an introduction groove 12 at a substantially center portion thereof, and the introduction groove 12 communicates with the guide groove 11a.

As shown in FIG. 1, the guide mechanism 10 further includes center engaging protrusions 13 protruding from substantially center portions of both side surfaces of the original reading unit 3; and backside protrusions 14 protruding from the both side surfaces of the original reading unit 3 on the backside of the image forming apparatus 1.

In the embodiment, when the backside protrusions 14 of the guide mechanism 10 engage the positioning grooves 11b, and the center engaging protrusions 13 of the guide mechanism 10 engage the guide grooves 11a at substantially center positions as shown in FIG. 1, it is possible to position the original reading unit 3 over the image forming unit 2 on the backside of the image forming apparatus 1.

When the original reading unit 3 is disposed over the image forming unit 2 on the backside of the image forming apparatus 1, the original reading unit 3 is situated away from a front side of the image forming unit 2 by a relatively large distance. Especially when the image forming apparatus 1 is placed on a second tray or an office desk, it is difficult to place or pick up an original on or from the original reading unit 3. Further, it is difficult to operate the operation panel 4 disposed on the original reading unit 3.

Figure 4:
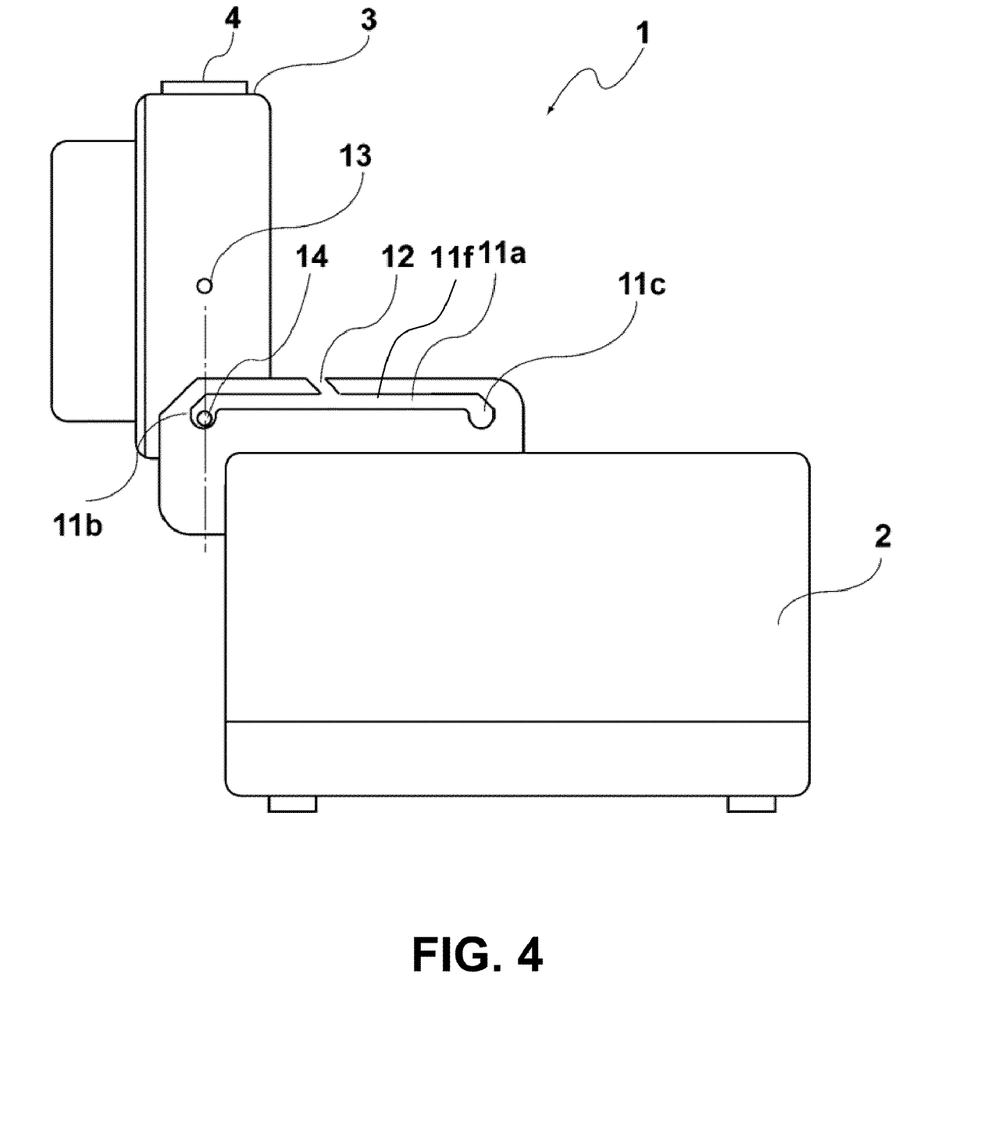
FIG. 4 is a schematic side view showing the image forming apparatus in a state that an original reading unit rotates with the guide mechanism according to the first embodiment of the present invention.

FIG. 4 is a schematic side view showing the image forming apparatus 1 in a state that the original reading unit 3 rotates with the guide mechanism 10 according to the first embodiment of the present invention.

In the embodiment, when the upper cover 6 needs to be opened or closed, the original reading unit 3 rotates in a counterclockwise direction around the backside protrusions 14 in the positioning grooves 11b, so that the center engaging protrusions 13 are disengaged from the introduction grooves 12. Accordingly, it is possible to open or close the upper cover 6.

In the embodiment, when the upper cover 6 is opened or closed, it is possible to remove a paper jam in the image forming unit 2, or to replace consumable supplies such as the image drum unit 32, a toner cartridge 33, the transfer belt unit 35, and the fixing device 39.

Figure 5:
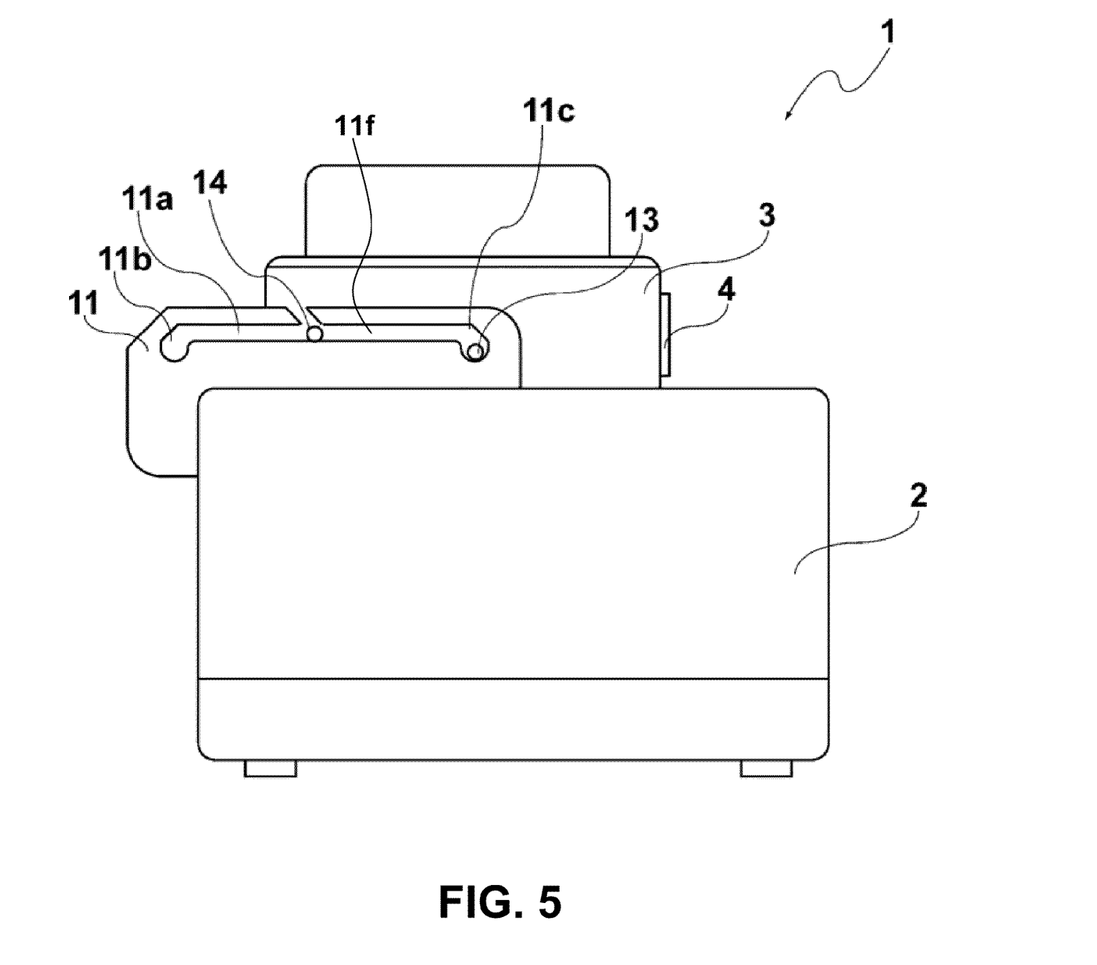
FIG. 5 is a schematic side view showing the image forming apparatus in a state that the original reading unit moves and is positioned at a center position over an image forming unit with the guide mechanism according to the first embodiment of the present invention.

FIG. 5 is a schematic side view showing the image forming apparatus 1 in a state that the original reading unit 3 moves and is positioned at the center position over the image forming unit 2 with the guide mechanism 10 according to the first embodiment of the present invention.

In the embodiment, the backside protrusions 14 and the center engaging protrusions 13 engage the guide grooves 11a. Accordingly, in a state that the original reading unit 3 is situated at the position shown in FIG. 1, when the original reading unit 3 is slightly lifted to disengage the backside protrusions 14 from the positioning grooves 11b, and the original reading unit 3 is pushed toward the front side of the image forming apparatus 1, the original reading unit 3 moves over the image forming unit 2 toward the front side of the image forming apparatus 1 as shown in FIG. 5.

When the center engaging protrusions 13 engage the positioning grooves 11c, the original reading unit 3 stops at the center of the image forming unit 2. Accordingly, it is possible to easily place or remove the original 23 on or from the original reading unit 3. Further, the operation panel 4 moves closer, so that it is possible to easily operate the operation panel 4. Further, a center of gravity of the image forming apparatus 1 moves toward center, so that it is possible to easily move the image forming apparatus 1.

Second Embodiment

Figure 6:
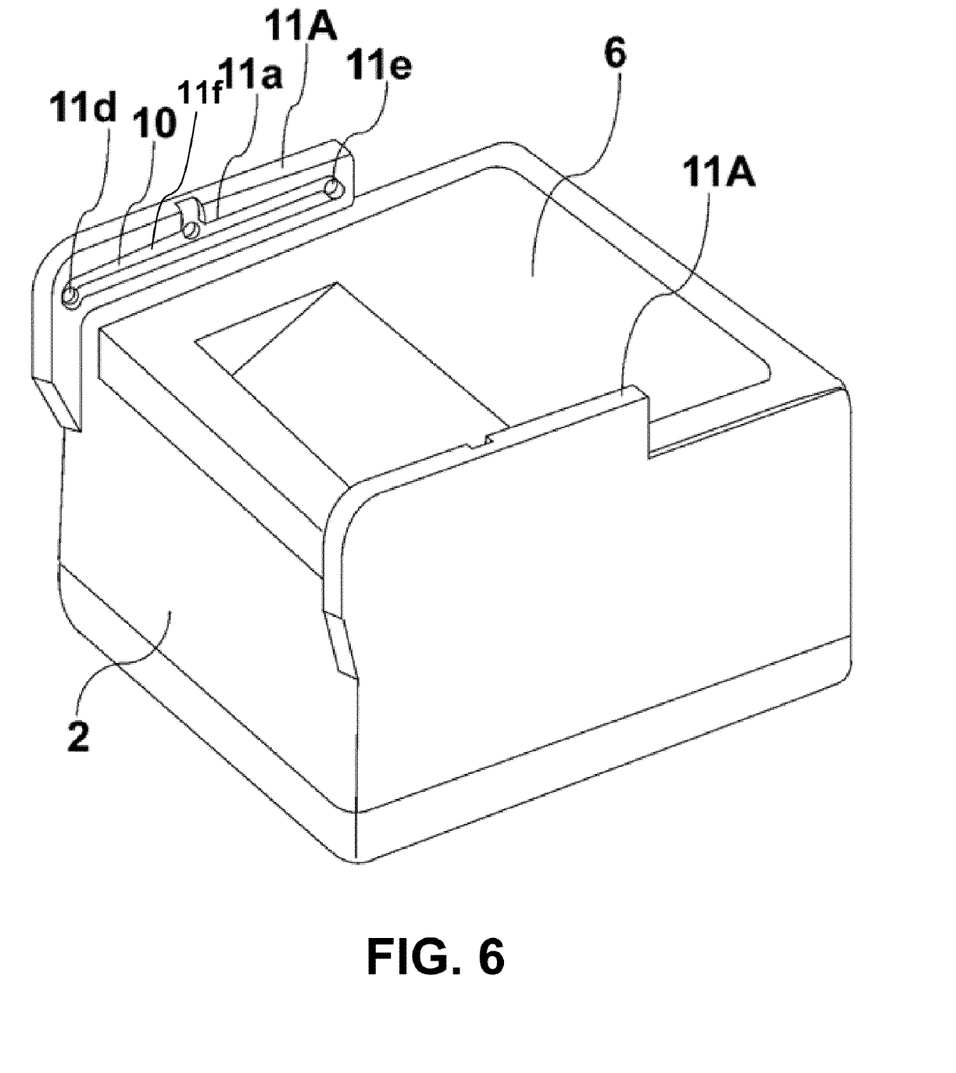
FIG. 6 is a schematic perspective view showing a guide mechanism of an image forming apparatus according to a second embodiment of the present invention.
Figure 7:
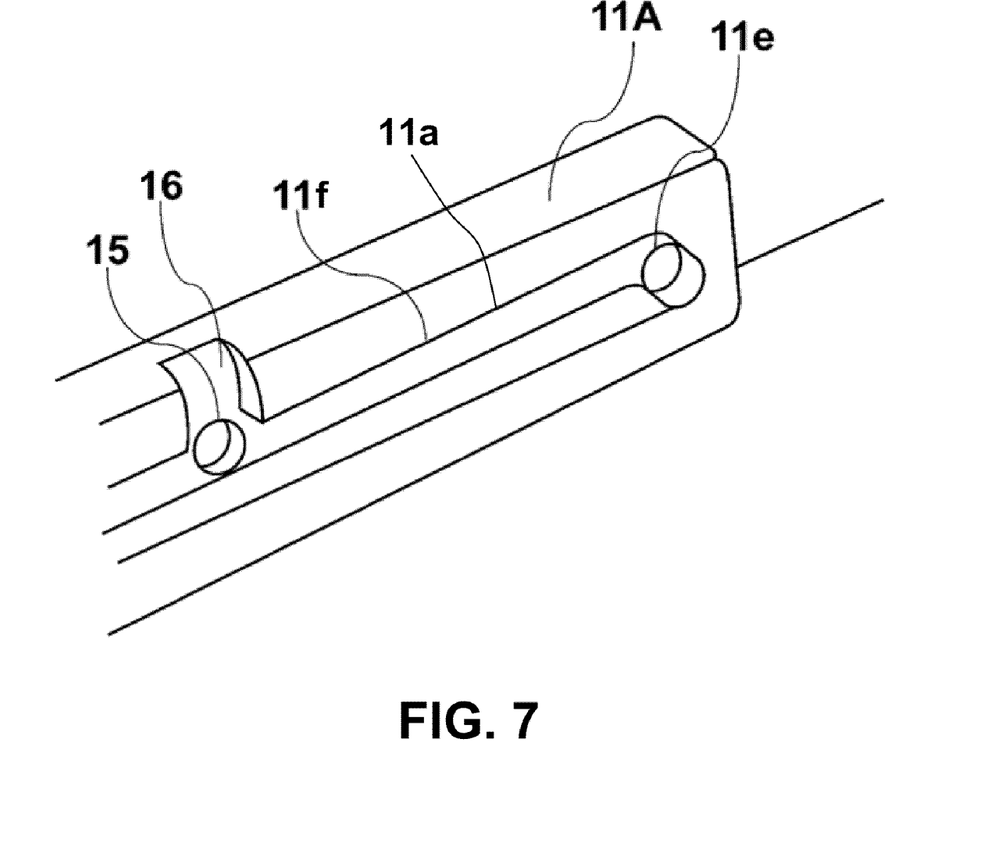
FIG. 7 is a schematic enlarged perspective view showing the guide mechanism of the image forming apparatus according to the second embodiment of the present invention.

A second embodiment of the present invention will be explained next. FIG. 6 is a schematic perspective view showing the guide mechanism 10 of the image forming apparatus 1 according to the second embodiment of the present invention. FIG. 7 is a schematic enlarged perspective view showing the guide mechanism 10 of the image forming apparatus 1 according to the second embodiment of the present invention.

As shown in FIGS. 6 and 7, the guide mechanism 10 includes a pair of guide walls 11A integrally formed at the upper edges of the image forming unit 2 on both sides thereof. Each of the guide walls 11 has the guide groove 11a formed of a recess groove. The guide groove 11a has positioning recess portions 11d and 11e at the both ends thereof, and the positioning recess portions 11d and 11e extend obliquely and downwardly.

In the embodiment, the guide wall 11A further has a stopper recess portion 15 at a substantially center portion thereof. An introduction recess groove 16 is formed at an upper position relative to the stopper recess portion 15, and the introduction recess groove 16 communicates with the guide groove 11a.

Figure 8:
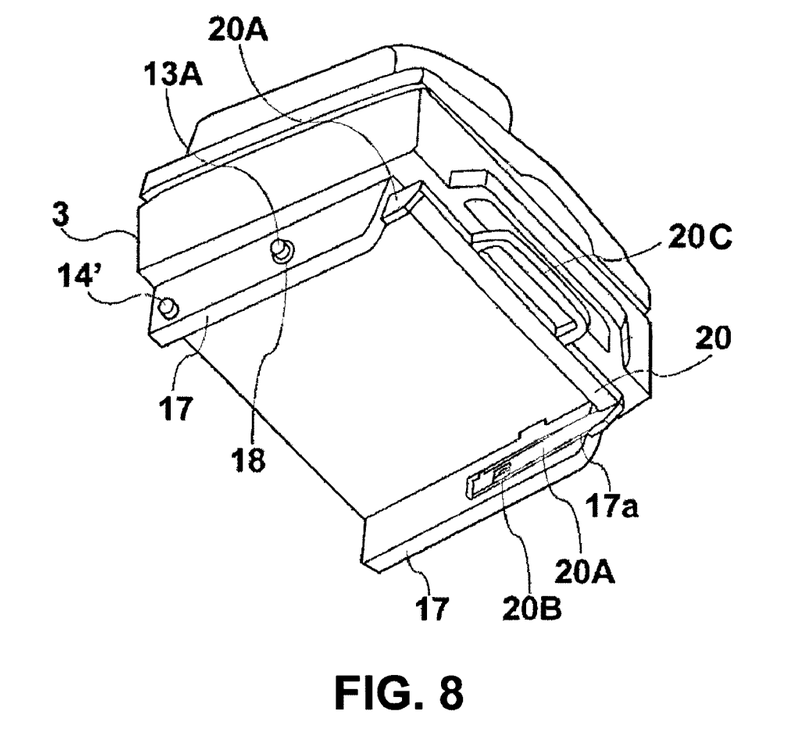
FIG. 8 is a schematic perspective view showing the guide mechanism of the image forming apparatus according to the second embodiment of the present invention.

FIG. 8 is a schematic perspective view showing the guide mechanism 10 of the image forming apparatus 1 according to the second embodiment of the present invention.

As shown in FIG. 8, the guide mechanism 10 includes a pair of guided walls 17 on a bottom surface thereof at both sides thereof. Each of the guided walls 17 has a backside protrusion 14' at a backside thereof, and a through hole 18 at a substantially center portion thereof. Further, each of the guided walls 17 as a recess portion 17a with a rectangular shape formed in an inner surface thereof, and a guide protrusion 19 with a trapezoidal shape is integrally formed in the recess portion 17a near the through hole 18.

In the embodiment, an operation portion 20 with a U character shape has arm portions 20A, so that the arm portions 20A are inserted in the recess portions 17a of the guided walls 17. Each of the arm portions 20A includes a center engaging protrusion 13A as a movable protrusion to be fitted in the through hole 18 of the guided wall 17, and a rectangular hole 20B for engaging the guide protrusion 19.

In the embodiment, the operation portion 20 is formed of a flexible plastic member, and further includes a lever 20C integrally formed on a front side of the original reading unit 3.

Figure 9:
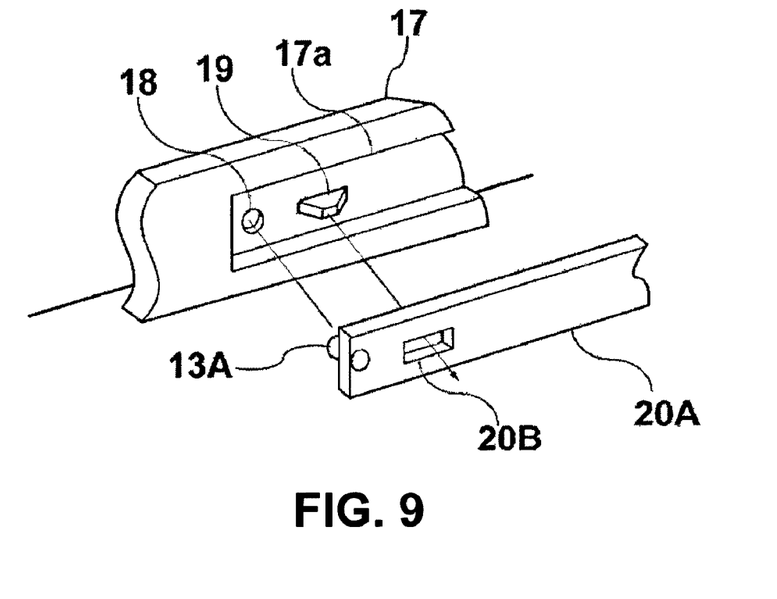
FIG. 9 is a schematic perspective view showing an arm portion and a guided wall of the guide mechanism of the image forming apparatus according to the second embodiment of the present invention.
Figure 10:
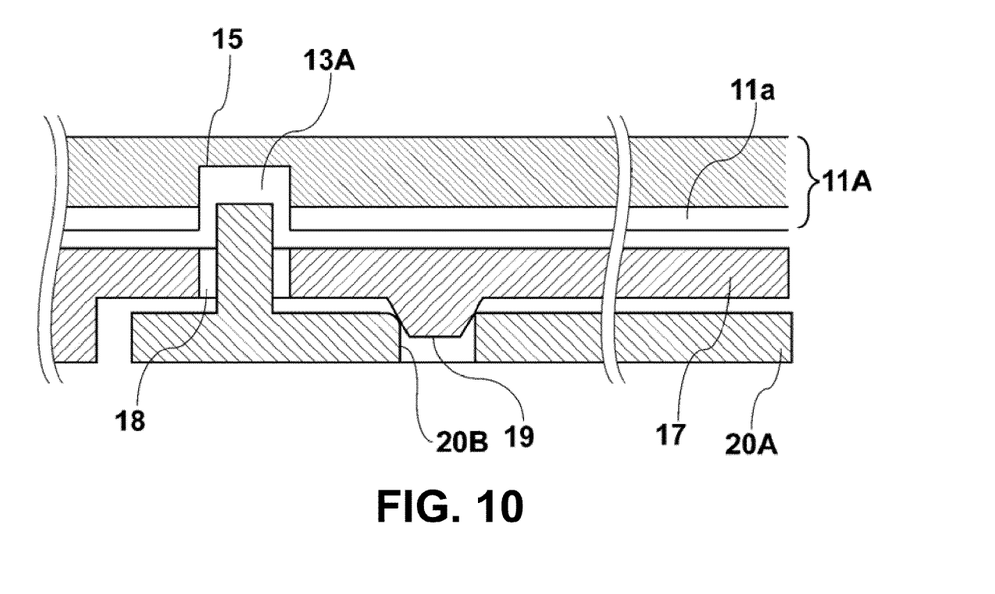
FIG. 10 is a schematic sectional view showing a center engaging protrusion of the guide mechanism of the image forming apparatus in a state that the center engaging protrusion protrudes according to the second embodiment of the present invention.

FIG. 9 is a schematic perspective view showing the arm portion 20A and the guided wall 17 of the guide mechanism 10 of the image forming apparatus 1 according to the second embodiment of the present invention. FIG. 10 is a schematic sectional view showing the center engaging protrusion 13A of the guide mechanism 10 of the image forming apparatus 1 in a state that the center engaging protrusion 13A protrudes according to the second embodiment of the present invention.

In the embodiment, when the original reading unit 3 is situated over the image forming unit 2 on the backside of the image forming apparatus 1, the backside protrusions 14' are fitted in the positioning recess portion 11d of the guide walls 11A, and the center engaging protrusions 13A are fitted in the stopper recess portions 15 of the guide walls 11A. Accordingly, in this state, it is not possible to rotate the original reading unit 3 in the counterclockwise direction around the backside protrusions 14', and it is possible to hold the original reading unit 3 over the image forming unit 2 on the backside of the image forming apparatus 1.

Figure 11:
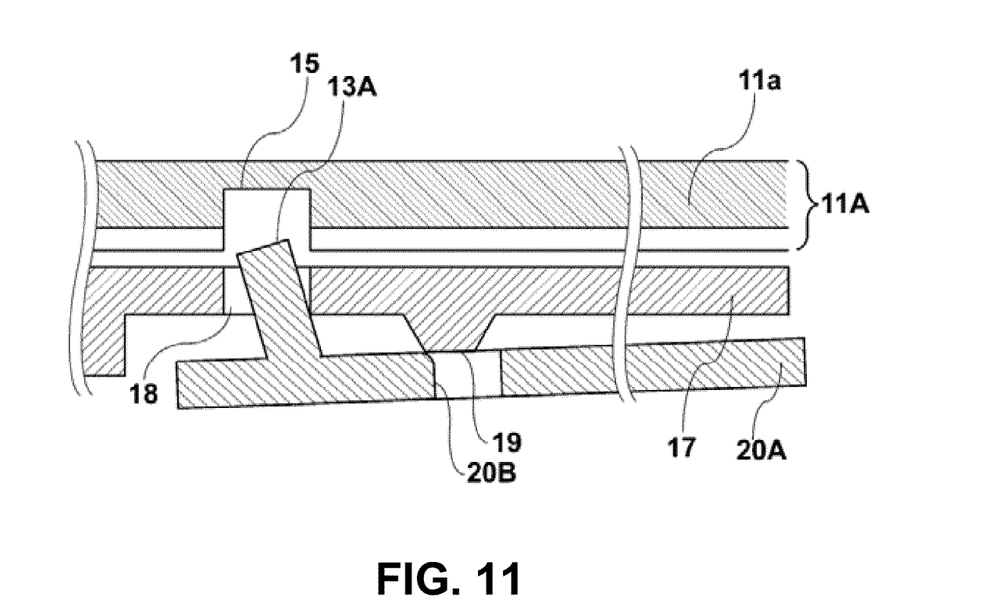
FIG. 11 is a schematic sectional view showing the center engaging protrusion of the guide mechanism of the image forming apparatus in a state that the center engaging protrusion retracts according to the second embodiment of the present invention.

FIG. 11 is a schematic sectional view showing the center engaging protrusion 13A of the guide mechanism 10 of the image forming apparatus 1 in a state that the center engaging protrusion 13A retracts according to the second embodiment of the present invention.

In the embodiment, when the lever 20C is pulled to apply tension to the arm portions 20A, the arm portions 20A move in a longitudinal direction thereof while greatly deforming due to elasticity thereof. Accordingly, as shown in FIG. 11, the arm portions 20A deform along the side surfaces of the guide protrusions 19, so that the rectangular holes 20B move away from the guide protrusions 19, i.e., the inner surfaces of the guided walls 17.

As a result, the center engaging protrusions 13A are disengaged from the stopper recess portions 15 of the guide walls 11A. Accordingly, it is possible to pull out the center engaging protrusions 13A through the introduction recess grooves 16, so that the original reading unit 3 rotates in the counterclockwise direction, thereby making it possible to open or close the upper cover 6 of the image forming unit 2.

In the embodiment, in the state that the center engaging protrusions 13A are disengaged from the stopper recess portions 15 of the guide walls 11A, when the original reading unit 3 is lifted to disengage the backside protrusions 14' from the positioning recess portions 11d of the guide walls 11A, and the original reading unit 3 is pulled toward the front side through the lever 20C, the center engaging protrusions 13A are guided with the guide grooves 11a and enter the positioning recess portions 11e while the original reading unit 3 is moving.

Further, when the original reading unit 3 stops upon releasing the lever 20C, the center engaging protrusions 13A protrude and are fitted in the positioning recess portions 11e. Accordingly, it is possible to hold the original reading unit 3 at the center of the image forming unit 2. As a result, it is possible to fix the original reading unit 3 when the image forming apparatus 1 moves, thereby making it possible to easily move the image forming apparatus 1.

In the embodiment, the center engaging protrusions 13A and the backside protrusions 14' may be formed on the image forming unit 2, and the guide walls 11A and the guide grooves 11a may be formed on the original reading unit 3.

Further, the guide mechanism 10 may include guide rails disposed on both sides of the image forming unit 2 and wheels disposed on the original reading unit 3 for engaging the guide rails.

Further, the guide grooves 11a of the guide walls 11A may extend in an inclined direction relative to the horizontal direction. With the configuration, it is possible to move the original reading unit 3 with a small force. Further, the center engaging protrusions 13A or the backside protrusions 14' may be formed of rotational bodies such as wheels.

Third Embodiment

Figure 16:
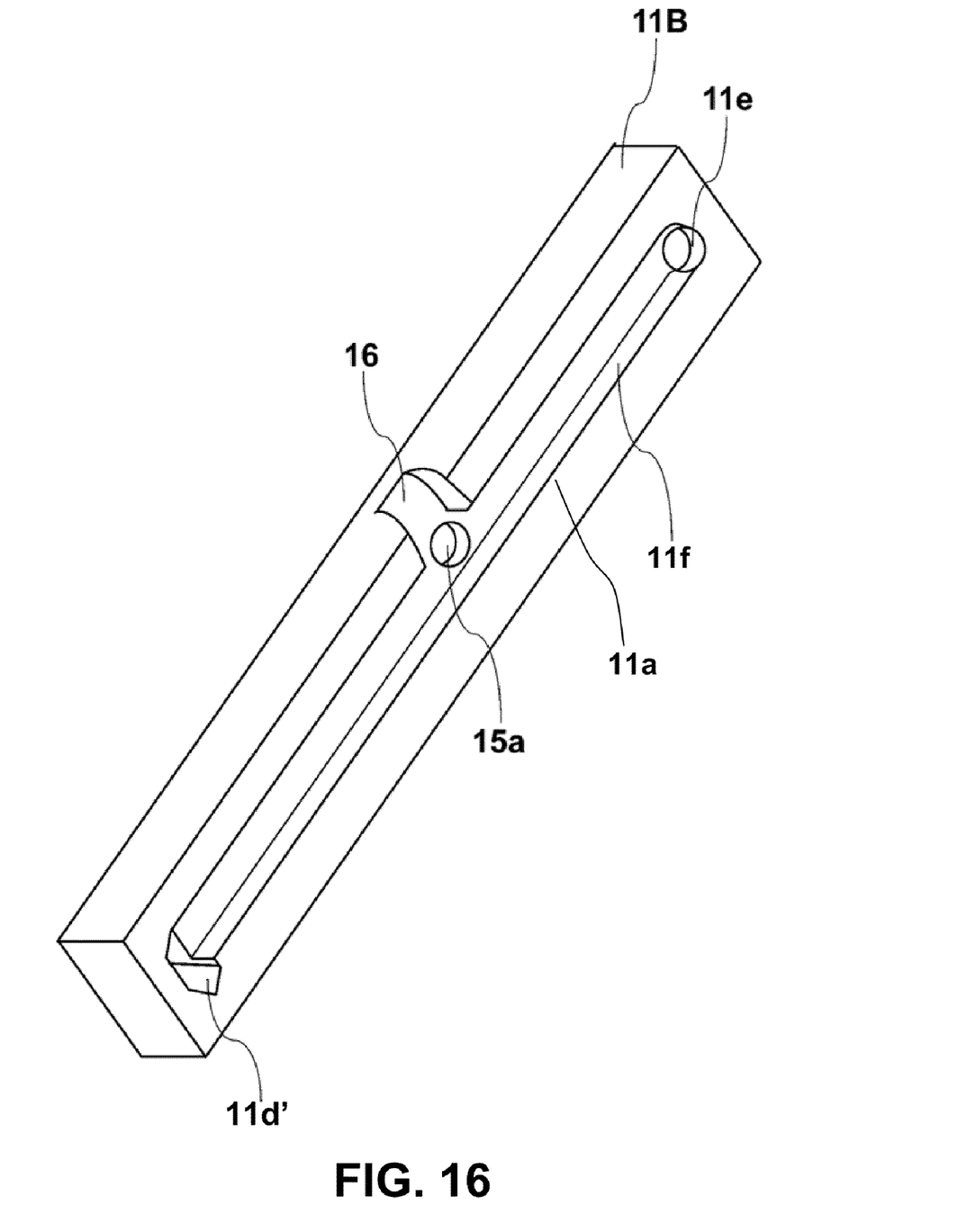
FIG. 16 is a schematic enlarged perspective view showing the guide mechanism of the image forming apparatus according to the third embodiment of the present invention.

A third embodiment of the present invention will be explained next. FIG. 16 is a schematic enlarged perspective view showing the guide mechanism 10 of the image forming apparatus 1 according to the third embodiment of the present invention.

As shown in FIG. 16, the guide mechanism 10 includes a pair of guide walls 11B integrally formed at the upper edges of the image forming unit 2 on both sides thereof. Each of the guide walls 11B has the guide groove 11a as a recess groove. The guide groove 11a has positioning recess portions 11d' and 11e at the both ends thereof, and the positioning recess portions 11d' and 11e extend obliquely and downwardly. The positioning recess portion 11d' has a polygonal shape.

Figure 12:
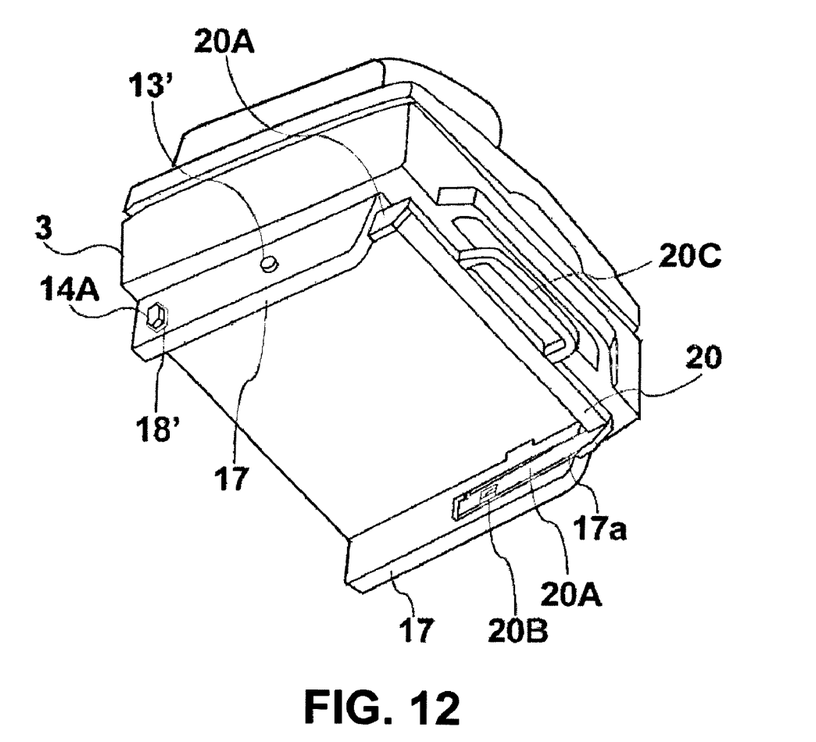
FIG. 12 is a schematic perspective view showing a guide mechanism of an image forming apparatus according to a third embodiment of the present invention.

FIG. 12 is a schematic perspective view showing the guide mechanism 10 of the image forming apparatus 1 according to the third embodiment of the present invention.

As shown in FIG. 12, the guide mechanism 10 includes a pair of the guided walls 17 on the bottom surface thereof at both sides thereof. Each of the guided walls 17 has a center engaging protrusion 13' at a substantially center portion thereof. Further, each of the guided walls 17 has a through hole 18' with a regular hexagon shape formed in a backside surface thereof.

In the embodiment, the arm portions 20A are inserted in the recess portions 17a of the guided walls 17. Each of the arm portions 20A includes a backside protrusion 14A for fitting in the through hole 18' of the guided wall 17. Further, the backside protrusion 14A has a section with a regular hexagon shape corresponding to the shape of the through hole 18'.

Figure 13:
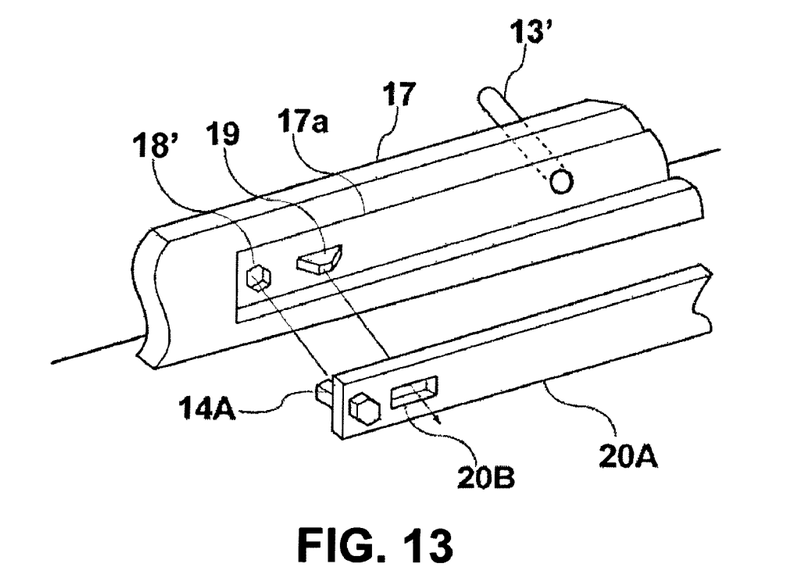
FIG. 13 is a schematic perspective view showing an arm portion and a guided wall of the guide mechanism of the image forming apparatus according to the third embodiment of the present invention.

FIG. 13 is a schematic perspective view showing the arm portion 20A and the guided wall 17 of the guide mechanism 10 of the image forming apparatus 1 according to the third embodiment of the present invention.

As shown in FIGS. 12 and 13, when the arm portions 20A of the operation portion 20 are inserted in the recess portions 17a of the guided walls 17, the backside protrusions 14A pass through the through holes 18' and protrude from the guided walls 17.

Figure 14:
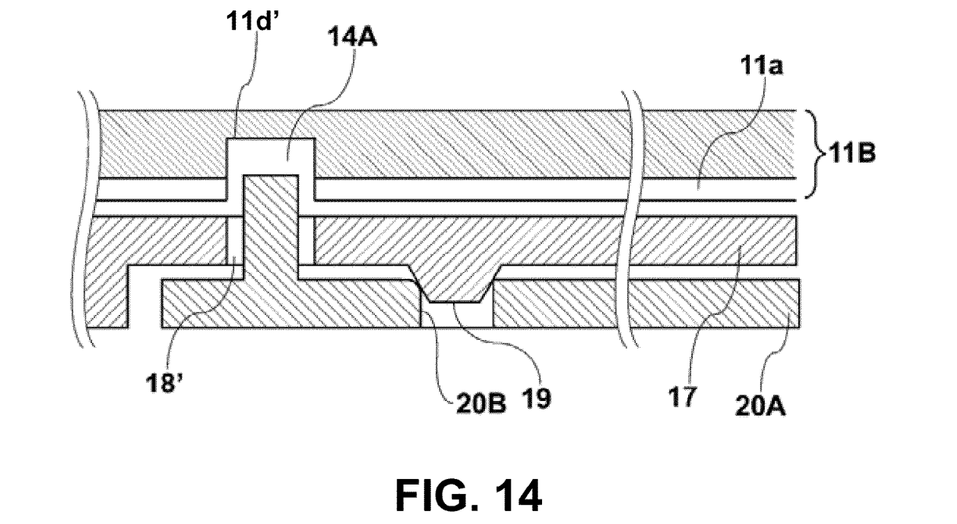
FIG. 14 is a schematic sectional view showing a backside protrusion of the guide mechanism of the image forming apparatus in a state that the backside protrusion protrudes according to the third embodiment of the present invention.

FIG. 14 is a schematic sectional view showing the backside protrusion 14A of the guide mechanism 10 of the image forming apparatus 1 in a state that the backside protrusion 14A protrudes according to the third embodiment of the present invention.

In the embodiment, as shown in FIG. 14, when the original reading unit 3 is situated over the image forming unit 2 at the backside of the image forming apparatus 1, the backside protrusions 14A protrude into the positioning recess portions 11d' of the guide walls 11B.

When the backside protrusions 14' are fitted in the positioning recess portion 11d' of the guide walls 11B, it is not possible to rotate the original reading unit 3 in the counter-clockwise direction around the backside protrusions 14'. Accordingly, it is possible to hold the original reading unit 3 over the image forming unit 2 on the backside of the image forming apparatus 1.

Figure 15:
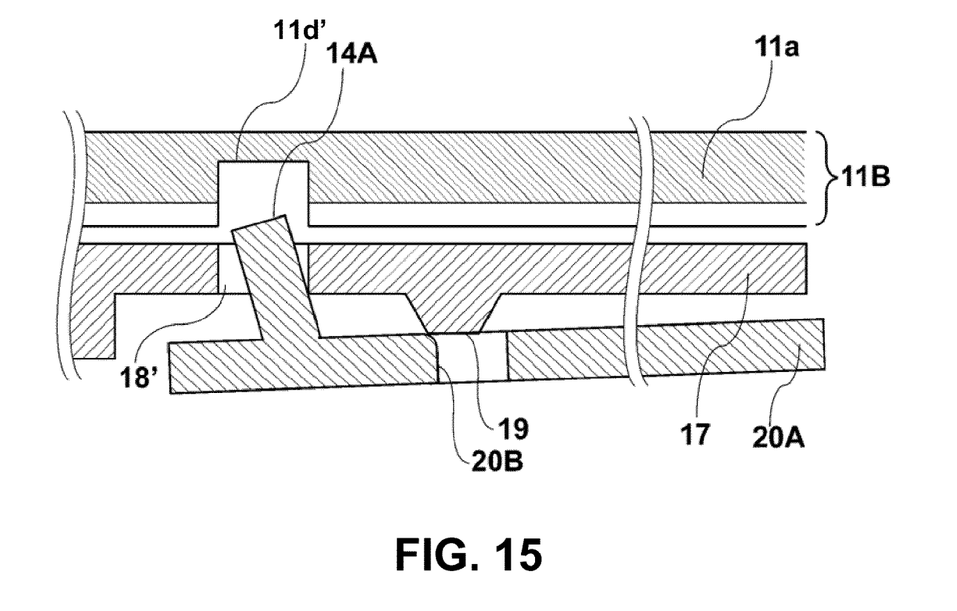
FIG. 15 is a schematic sectional view showing the backside protrusion of the guide mechanism of the image forming apparatus in a state that the backside protrusion retracts according to the third embodiment of the present invention.

FIG. 15 is a schematic sectional view showing the backside protrusion 14A of the guide mechanism 10 of the image forming apparatus 1 in a state that the backside protrusion 14A retracts according to the third embodiment of the present invention.

In the embodiment, when the lever 20C is pulled to apply tension to the arm portions 20A, the arm portions 20A move in the longitudinal direction thereof while greatly deforming due to elasticity thereof. Accordingly, as shown in FIG. 15, the arm portions 20A deform along the side surfaces of the guide protrusions 19, so that the rectangular holes 20B move away from the guide protrusions 19, i.e., the inner surfaces of the guided walls 17.

As a result, the backside protrusions 14A are disengaged from the positioning recess portion 11d' of the guide walls 11B. Accordingly, it is possible to pull out the center engaging protrusions 13A through the introduction recess grooves 16, so that the original reading unit 3 rotates in the counterclockwise direction.

In the embodiment, when the lever 20C is released after the original reading unit 3 rotates by a specific angle, the backside protrusions 14A protrude and enter the positioning recess portion 11d' of the guide walls 11B, thereby fixing the original reading unit 3. Accordingly, while the original reading unit 3 stays at the specific angle, it is possible to open or close the upper cover 6 of the image forming unit 2.

In the embodiment, in the state that the backside protrusions 14A are disengaged from the positioning recess portion 11d' of the guide walls 11B, when the original reading unit 3 is pulled toward the front side through the lever 20C, the backside protrusions 14A are guided with the guide grooves 11a and enter stopper recess portions 15a while the original reading unit 3 is moving. When the lever 20C is released, the backside protrusions 14A protrude into the stopper recess portions 15a.

In the embodiment, the stopper recess portions 15a may have a hexagonal shape similar to that of the backside protrusions 14A. Further, the backside protrusions 14A may have a polygonal shape other than the regular hexagonal, and the positioning recess portion 11d' of the guide walls 11B may have a corresponding polygonal shape.

The disclosure of Japanese Patent Application No. 2008-258930, filed on Oct. 3, 2008, is incorporated in the application by reference.

While the invention has been explained with reference to the specific embodiments of the invention, the explanation is illustrative and the invention is limited only by the appended claims.

What is claimed is:

1. An image forming apparatus, comprising:
   an image forming unit having a front surface and a backside surface facing each other in a first direction;
   an original reading unit disposed above the image forming unit; and
   a guide mechanism for moving and positioning the original reading unit in the first direction over the image forming unit between the backside surface of the image forming apparatus and the front surface of the image forming apparatus,
   wherein said guide mechanism includes a wall portion disposed above the image forming unit and extending in the first direction;
   a guide groove formed in the wall portion and extending in the first direction, said guide groove including a guide groove main portion extending in the first direction, a first positioning groove end portion formed at one end portion of the guide groove main portion, and a second positioning groove end portion formed at the other end portion of the guide groove main portion, said first positioning groove end portion being situated close to the backside surface relative to the second positioning groove end portion, said first positioning groove end portion being situated behind the backside surface in the first direction; and
   a protrusion protruding from a side of the original reading unit in a second direction perpendicular to the first direction for engaging the guide groove to be slidable.

2. The image forming apparatus according to claim 1, wherein said first positioning groove end portion is situated below the guide groove main portion at the one end portion of the guide groove main portion and said second positioning groove end portion is situated below the guide groove main portion at the other end portion of the guide groove main portion.

3. The image forming apparatus according to claim 1, wherein said protrusion includes a first protrusion capable of engaging the first positioning groove end portion, and a second protrusion capable of engaging the second positioning groove end portion.

4. The image forming apparatus according to claim 3, wherein said guide groove includes a first positioning recess portion at the first positioning groove end portion capable of engaging the first protrusion, and a second positioning recess portion at the second positioning groove end portion capable of engaging the second protrusion.

5. The image forming apparatus according to claim 3, wherein said wall portion includes an opening portion communicating with the guide groove, said opening portion being arranged to face the second protrusion when the first protrusion engages with the first positioning groove end portion.

6. The image forming apparatus according to claim 5, wherein said original reading unit is arranged to be rotatable relative to the image forming unit around the first protrusion when the first protrusion engages with the first positioning groove end portion.

7. The image forming apparatus according to claim 1, wherein said wall portion includes an opening portion communicating with the guide groove.

8. The image forming apparatus according to claim 1, wherein said protrusion is arranged to be movable in the second direction.

9. The image forming apparatus according to claim 8, wherein said original reading unit includes an operation portion arranged to be capable of being pulled in the first direction, said protrusion being arranged to move in the second direction when the operation portion is pulled in the first direction.

10. The image forming apparatus according to claim 9, wherein said operation portion includes a layer portion to be operated by a user, and an arm portion extending from an end portion of the lever portion, said protrusion being disposed on the arm portion.

11. The image forming apparatus according to claim 8, wherein said protrusion has a polygonal column shape.

12. The image forming apparatus according to claim 8, wherein said protrusion has a hexagonal column shape.

13. The image forming apparatus according to claim 1, wherein said protrusion has a cylindrical column shape.

* * * * *